United States Patent

Brucker

[11] Patent Number: 5,418,412
[45] Date of Patent: May 23, 1995

[54] DRIVE DISCONNECT FOR OIL-COOLED ELECTRICAL GENERATOR

[75] Inventor: Stephen F. Brucker, Aurora, Ohio

[73] Assignee: Lucas Aerospace Power Equipment Corporation, Aurora, Ohio

[21] Appl. No.: 196,702

[22] Filed: Feb. 15, 1994

[51] Int. Cl.⁶ .................. H02K 9/19; H02K 23/68; H02K 7/10
[52] U.S. Cl. .................. 310/75 R; 310/54; 310/58; 310/119; 310/93
[58] Field of Search .......... 310/54, 58, 75 R, 112, 310/113, 119, 121, 93; 464/30, 32, 33, 179; 188/290, 291, 292, 293, 294, 295, 296

[56] References Cited

U.S. PATENT DOCUMENTS

| | | | |
|---|---|---|---|
| 2,887,593 | 5/1959 | Wiedemann | 310/58 |
| 2,941,473 | 6/1960 | Lorenz | 464/32 |
| 3,089,045 | 5/1963 | Derks | 310/53 |
| 3,525,011 | 8/1970 | Erickson | 310/54 |
| 3,739,208 | 6/1973 | Shartrand | 310/58 |
| 3,835,919 | 9/1974 | Lambrecht et al. | 310/54 |
| 4,669,999 | 6/1987 | Miller | 464/32 |
| 4,692,280 | 6/1990 | Becker et al. | 464/32 |
| 5,034,638 | 7/1991 | McCabria | 310/54 |

Primary Examiner—Thomas M. Dougherty
Assistant Examiner—Clayton E. LaBalle
Attorney, Agent, or Firm—Rankin, Hill, Lewis & Clark

[57] ABSTRACT

An electric generator of the type that is oil-cooled and generally used in aircraft includes a fluid brake assembly. The fluid brake assembly includes a fluid brake rotor which is generally in the form of a fan or impeller which is connected to the drive shaft of the generator. Under normal conditions with the cooling oil withdrawn from the housing of the generator by the scavenge system, the fluid brake rotor freely turns with the shaft. When the oil scavenge system becomes incapacitated, the generator becomes "flooded" and the fluid brake rotor acts as pump to try to pump the oil, creating a torque load on the drive shaft. This load is preferably greater than the shear strength of the shaft, causing the shaft to shear and disconnecting the generator from the aircraft engine. By shearing the drive shaft, the operation of the main engine is unaffected by the flooding of the generator, and serious failure of the aircraft engine is avoided.

14 Claims, 3 Drawing Sheets

DRIVE DISCONNECT FOR OIL-COOLED ELECTRICAL GENERATOR

BACKGROUND OF THE INVENTION

1. Field of the Invention

This invention relates to electrical generators, and more particularly to generators that are spray-oil cooled.

2. Description of the Prior Art

Electrical generators use various cooling techniques. Generators used in aircraft are often spray oil cooled. These generators are driven by the main engine of the aircraft, and they are cooled with the oil that is shared with the main engine for its cooling and lubrication.

These spray-oil cooled electrical generators rely upon a scavenge system to remove sprayed oil from the generator and return it to the main oil supply. The scavenge system includes a scavenge pump which is driven by the same power chain as the generator. If the scavenge system becomes incapacitated, either internal to the generator or external to the generator, the oil will accumulate in the generator, and the generator will become "flooded."

Continued operation of a generator "flooded" with cooling oil can result in severe damage to the generator. Temperatures within the generator would continue to increase as a result of frictional heating imparted by the generator rotor. The trapped oil would not relieve the heat generated, and eventually, a failure of the generator housing could occur. When the generator housing fails, the result is a loss of the oil supply which is shared with the main engine, and this can cause main engine shut-down, which is an extremely dangerous situation in aircraft.

There is thus a need for design for an electric generator in aircraft which would prevent such a catastrophic failure in the event that the generator becomes flooded with oil.

SUMMARY OF THE INVENTION

These and other problems are solved by the present invention of a generator for use in shared oil cooling systems or the like in which a fluid brake assembly is provided with the generator to stop operation of the generator when the generator becomes "flooded" with cooling oil.

In accordance with the present invention, a fluid brake assembly is provided within the generator. The fluid brake assembly includes a rotor element and a stator element. The fluid brake rotor functions generally as a pump impeller and is mounted on the drive shaft of the generator. The fluid brake rotor turns within the fluid brake stator which functions generally as a diffuser element. Under normal conditions with proper oil scavenging, the fluid brake rotor freely turns with the generator shaft. Under a flooded condition, the impeller formed by the fluid brake rotor pumps oil radially into the recirculating diffuser section. The torque need to drive this highly inefficient "pump" together with the torque required to drive the functional rotor elements of the generator which are also mounted on the shaft exceeds the torsional strength of the generator drive shaft, and the drive shaft shears. When the shaft shears, the generator rotor elements mounted on the shaft assembly are disconnected from the main drive engine of the aircraft, the rotor elements of the generator cease to turn and the source of frictional oil heating is eliminated.

The present invention provides a simple and effective means for preventing catastrophic failure of the aircraft engine due to flooding of the generator which is connected to the engine. In accordance with the present invention, the connection between the main engine and the generator is severed when the generator becomes flooded and the oil supply to the main engine is jeopardized. In this way, the operation of the main engine is unaffected by flooding of the cooling oil in the generator, and the main engine can continue to function.

These and other advantages are provided by the present invention of an electric generator which comprises a housing and a shaft extending into the housing. The shaft is adapted to be connected to a prime mover. The generator also comprises generator elements including a field assembly mounted within the housing and an armature assembly mounted on the shaft within the housing for rotation within the field assembly. There are means for cooling the generator elements with a fluid introduced into the housing and withdrawn therefrom. A fluid brake receives fluid within the housing. The fluid brake includes a fluid brake rotor connected to the shaft and rotating with the shaft. The fluid brake creates a load on the shaft when the fluid accumulates in the housing. Preferably, the resulting load on the shaft is greater than the shear strength of the shaft, so that the shaft shears when the fluid stops accumulating in the housing to disconnect the generator from the prime mover.

DETAILED DESCRIPTION OF THE PREFERRED EMBODIMENT

Figure 1:
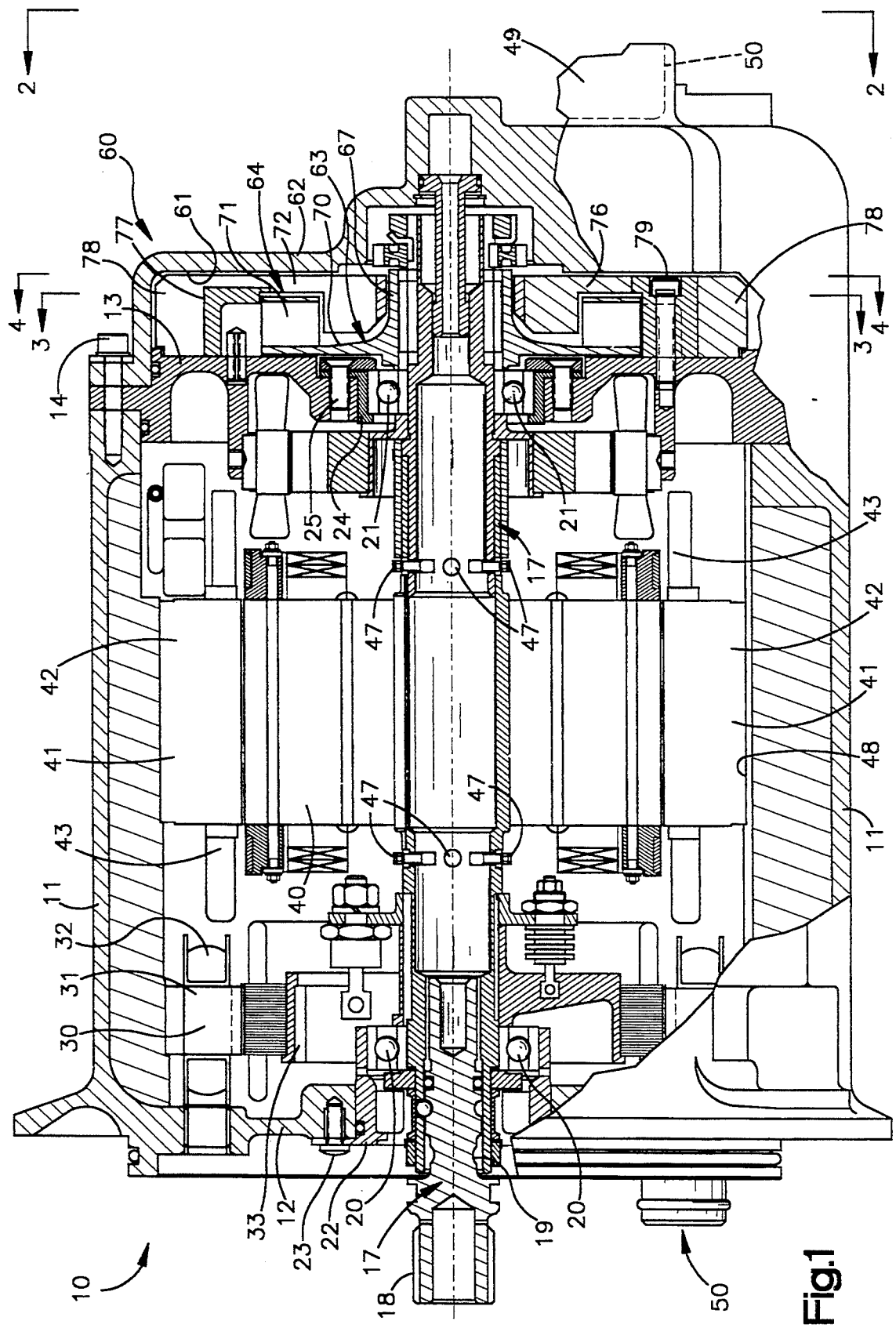
FIG. 1 is a side elevational view, partially in section, of a generator incorporating the present invention.
Figure 2:
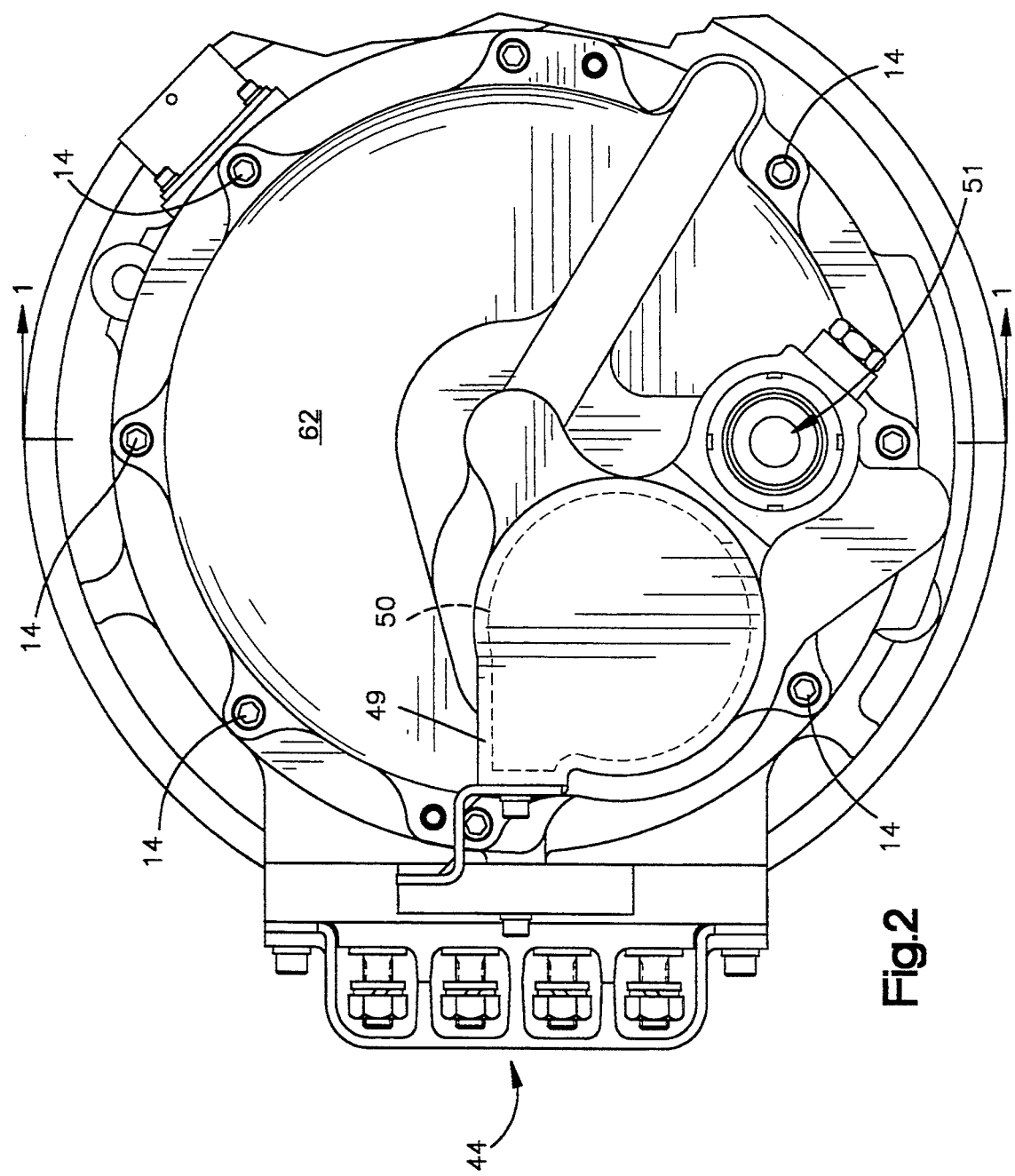
FIG. 2 is an end elevational view taken along line 2—2 of FIG. 1.

Referring more particularly to the drawings and initially to FIG. 1, there is shown a generator 10 incorporating the present invention. The generator 10 is an AC generator of the type generally used in many aircraft. The housing, stators and rotors of the generator 10 are essentially the same as those in a Model 31200-002 generator available from Lucas Aerospace Power Equipment Corporation, of Aurora, Ohio. The generator 10 includes a main housing 11 which forms the outer cylindrical housing of the generator and provides mounting for the stators. The main housing 11 includes an integral front end cap 12 which encloses the front end of the generator. A separate rear end cap 13 which is mounted to the rear end of the housing by screws 14 encloses the rear end of the generator.

The generator is driven by a shaft assembly 17 which has a drive connection 18 at one end for connection to the main aircraft engine. A portion of the shaft assembly 17 near the drive connection 18 is reduced in diameter to provide a neck portion 19 which is used to shear the shaft to disconnect the generator from the main engine, as will be explained in more detail below. The shaft assembly 17 extends within an opening in the middle of the front end cap 12 and is journalled in bearings 20 at the front of the generator and bearings 21 at the rear of the generator. The front bearings 20 are held within a front bearing support 22 which is attached to the front end cap 12 of the main housing 11 by mounting screws 23. The rear bearings 21 are held within a rear bearing support 24 which is attached to the rear end cap 13 by mounting screws 25.

D.C. excitation is provided by an exciter field comprising an exciter stator 30. The excitor stator 30 which comprises a core 31 and a plurality of windings 32 thereon is mounted on the interior of the main housing 11 near the front end cap 12. An exciter rotor 33 is mounted on the rotatable shaft assembly 17 an turns within the exciter field provided by the stator 30.

A main armature or rotor 40 is mounted on the rotatable shaft assembly 17 toward the middle of the main housing 11. The main rotor 40 turns within a main field or stator assembly 41 comprising a stator core 42 supporting a plurality of windings 43. The main stator assembly 41 is mounted on the interior of the main housing 11. The windings are connected to the terminal block 44 to provide the output of the generator.

The generator 10 is spray oil cooled, and is cooled with the oil that is shared with the main engine for its cooling and lubrication. The cooling oil is fed through the hollow interior of the shaft assembly 17, and it enters the generator housing though spray jets 47 positioned on the shaft assembly on both sides of the main rotor 40. The oil is sprayed from the jets 47 onto the main rotor and stator 40 and 41 which are the major source of heating in the generator. The sprayed oil settles in a sump 48 provided at the bottom of the main housing 11. Lubricating oil in the sump 48 is removed from the generator by means of a scavenge pump 50 located in a pump housing portion 49 in the lower portion of the generator. The scavenge pump 50 is operated by a drive connection with the shaft assembly 17, such as by appropriate gearing. Oil pumped from the sump 48 by the scavenge pump 50 leaves the generator housing through an outlet port 51, and the oil returns to the main oil supply.

All of the above generator elements are well known and need not be described in further detail.

In accordance with the present invention, a fluid brake assembly 60 is provided at the rear of the generator 10. The fluid brake assembly 60 is located within a chamber 61 formed by a fluid brake housing cap 62 which is mounted to the rear end cap 13 by the screws 14. The fluid brake assembly 60 comprises a fluid brake rotor 63 and a fluid brake stator 64.

Figure 3:
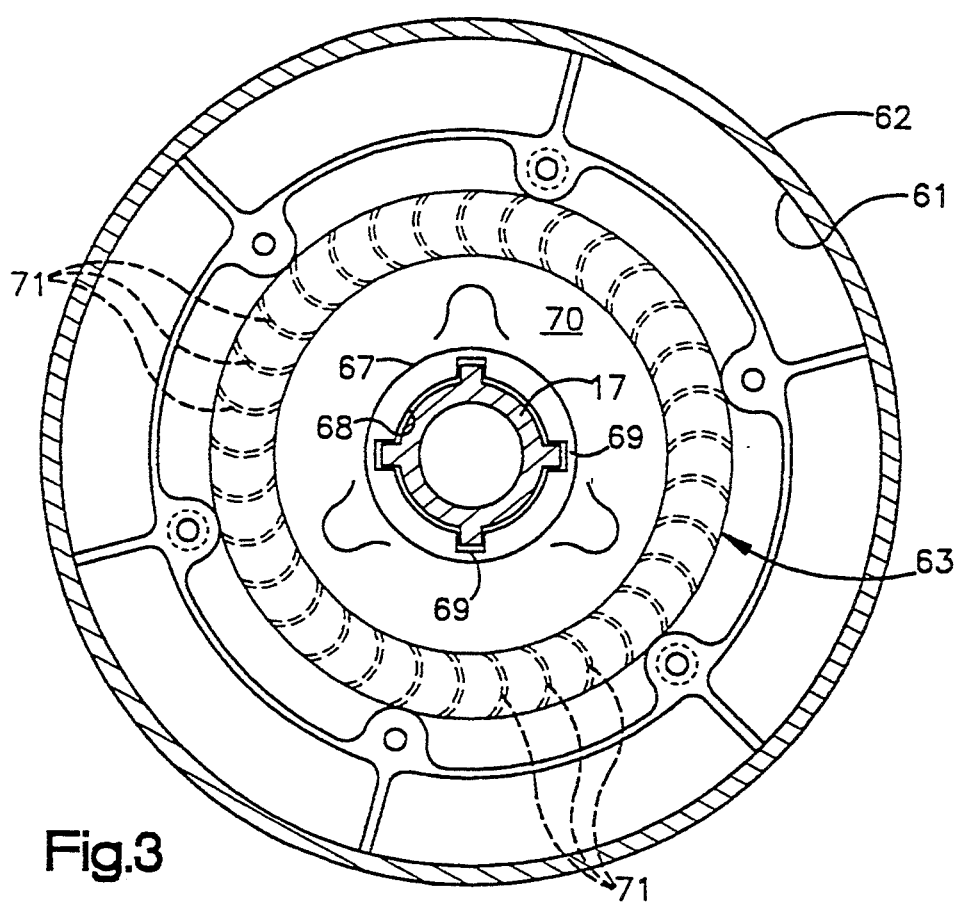
FIG. 3 is a side sectional view taken along line 3—3 of FIG. 1 showing the fluid brake rotor.

The fluid brake rotor 63 is shown in more detail in FIGS. 1 and 3. The rotor 63 includes a central hub 67 that has a central opening 68 through which the shaft assembly 17. extends. A plurality of notches 69 are provided around the central opening 68 which engage corresponding splines on the shaft assembly 17, so that the rotor 63 is keyed to the shaft assembly and is thus rigidly mounted to rotate with the shaft assembly. Extending from the hub 67 is a circular disk portion 70 having a plurality of vanes 71. The fluid brake rotor 63 is thus similar in structure to a centrifugal fan or an impeller of a pump, with the vanes 71 channeling fluid radially outwardly.

Figure 4:
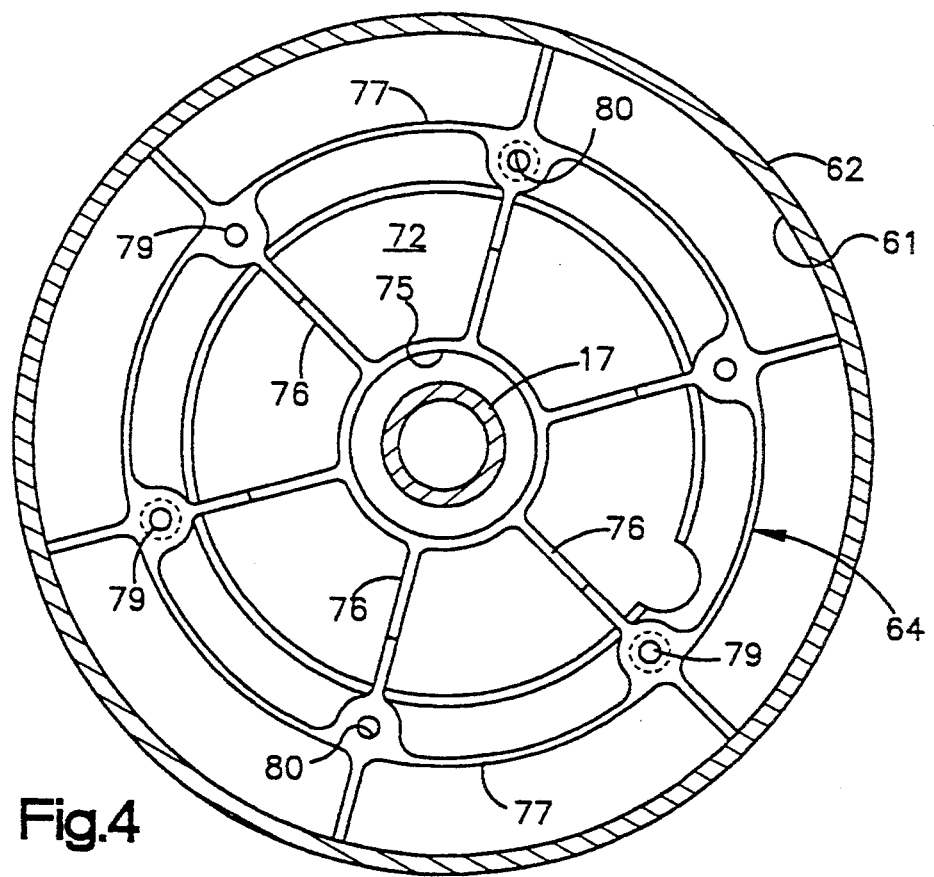
FIG. 4 is a side sectional view taken along line 4—4 of FIG. 1 showing the fluid brake stator.

The fluid brake stator 64 is shown in more detail in FIGS. 1 and 4. The stator 64 includes a circular disk portion 72 having a central opening 75 into which the hub 67 of the rotor 63 fits with clearance so that the rotor can freely turn. A plurality of ribs 76 extend radially from the central opening 75 to a circumferential flange 77 which extends around the rim of the disk portion 72 Each of the ribs 76 have extensions 78 that extend radially beyond the flange 77 to increase the torque capability of the stator 64. The fluid brake stator 64 thus fits around the rotor 63 and provides a static diffuser element for the impeller of the rotor. The stator 64 is attached to rear end cap 13 by means of screws 79 which extend through openings 80 in the stator located at each of the ribs 76 adjacent to the flange 77 and through corresponding threaded openings in the rear end cap.

Under normal conditions with proper oil scavenging, the impeller of the fluid brake rotor 63 turns freely with the shaft assembly 17. Any oil mist that may enter the chamber 61 will not have any effect on the operation of the fluid brake rotor 63.

If the scavenge system becomes incapacitated, the oil will not be removed from the sump 48 by the scavenge pump, oil will accumulate within the generator, and the generator will become "flooded." Continued operation of the generator when it is flooded with cooling oil can result in severe damage to the generator. Frictional heating imparted by the rotor elements mounted on the shaft assembly 17 will continue to increase temperatures, and the trapped oil will be unable to relieve the heat generated. Without the fluid brake assembly 60 of the present invention, a failure of the generator housing could eventually occur as the temperatures increase. Since the oil supply is shared with the main engine, the failure of the generator housing would cause a loss of the oil supply to the main engine, and this can cause main engine shut-down.

The fluid brake assembly 60 of the present invention, however, prevents catastrophic failure of the oil supply to the main engine. Under a flooded condition, oil enters the fluid brake chamber 61, since the chamber 61 is not sealed from the rest of the interior of the generator. The swirling oil encounters the fluid brake stator 64 which acts to stabilize the oil flow and reduce the swirling. The impeller vanes 71 of the rotor 63 then begin to pump oil radially into the recirculating diffuser section. The torque needed to drive this highly inefficient "pump" together with the torque required to drive the functional rotor elements mounted on the shaft assembly 17, exceed the torsional strength of the generator drive shaft, and the drive shaft shears. The neck portion 19 is provided at the forward end of the shaft assembly 17 near the drive connection 18 provides a location where the torsional strength of the shaft is minimized and the shearing can readily occur. When the shaft assembly 17 shears, the generator rotor elements mounted on the shaft assembly are disconnected from the main drive engine of the aircraft, the rotor elements of the generator cease to turn and the source of frictional oil heating is eliminated.

While the shaft assembly 17 has sheared and requires replacement, the other elements of the generator remain undamaged. More importantly, the main aircraft engine is unaffected by the flooded generator, avoiding catastrophic failure to the aircraft.

Other variations and modifications of the specific embodiments herein shown and described will be apparent to those skilled in the art, all within the intended spirit and scope of the invention. While the invention has been shown and described with respect to particular embodiments thereof, these are for the purpose of illustration rather than limitation. Accordingly, the patent is not to be limited in scope and effect to the specific embodiments herein shown and described nor in any other way this is inconsistent with the extent to which the progress in the art has been advanced by the invention.

What is claimed is:

1. An electric generator which comprises:

a housing;

a shaft extending into the housing, the shaft adapted to be connected to a prime mover;

generator elements including a field assembly mounted within the housing and an armature assembly mounted on the shaft within the housing for rotation within the field assembly;

means for cooling the generator elements with a liquid introduced into the housing and withdrawn therefrom;

a fluid brake receiving fluid within the housing, the fluid brake including a fluid brake rotor connected to the shaft and rotating with the shaft, the fluid brake freely rotating with the shaft when there is no accumulation of liquid in the housing, the fluid brake creating a load on the shaft when the liquid accumulates in the housing.

2. The electric generator of claim 1, comprising in addition means for withdrawing the liquid from the housing.

3. The electric generator of claim 2, wherein the withdrawing means comprises scavenging pump means.

4. The electric generator of claim 1, wherein the fluid brake also includes a fluid brake stator which is positioned adjacent to the fluid brake rotor.

5. The electric generator of claim 1, wherein the fluid brake rotor comprises a fan which acts to pump liquid when the liquid accumulates in the housing.

6. The electric generator of claim 5, wherein the fluid brake also includes a fluid brake stator which comprises a diffuser element positioned adjacent to the fluid brake rotor.

7. An electric generator which comprises:

a housing:

a shaft extending into the housing, the shaft adapted to be connected to a prime mover;

generator elements including a field assembly mounted within the housing and an armature assembly mounted on the shaft within the housing for rotation within the field assembly;

means for cooling the generator elements with a fluid introduced into the housing and withdrawn therefrom;

a fluid brake receiving fluid within the housing, the fluid brake including a fluid brake rotor connected to the shaft and rotating with the shaft, the fluid brake creating a load on the shaft when the fluid accumulates in the housing, the fluid brake rotor creating an additional load on the shaft when the fluid accumulates in the housing, the additional load contributing to the create a resultant load on the shaft which is greater than the shear strength of the shaft, causing the shaft to shear when the fluid accumulates in the housing.

8. The electric generator of claim 7, comprising in addition means for withdrawing the fluid from the housing.

9. The electric generator of claim 8, wherein the withdrawing means comprises scavenging pump means.

10. The electric generator of claim 7, wherein the fluid brake also includes a fluid brake stator which is positioned adjacent to the fluid brake rotor.

11. The electric generator of claim 7, wherein the fluid brake rotor comprises a fan which acts to pump fluid when the fluid accumulates in the housing.

12. The electric generator of claim 11, wherein the fluid brake rotor freely turns when the fluid is being withdrawn from the housing.

13. The electric generator of claim 11, wherein the fluid brake also includes a fluid brake stator which comprises a diffuser element positioned adjacent to the fluid brake rotor.

14. An electric generator which comprises:

a housing;

a shaft extending into the housing, the shaft adapted to be connected to a prime mover;

a field assembly mounted on a stator within the housing;

an armature assembly mounted on the shaft within the housing for rotation within the field assembly;

means for cooling elements within the housing with a fluid introduced into the housing and withdrawn therefrom;

a fluid brake receiving fluid within the housing, the fluid brake including a fluid brake rotor in the form of an impeller connected to the shaft, the fluid brake also including a fluid brake stator in the form of a diffuser element, the fluid brake rotor rotating freely with the shaft as fluid is withdrawn from the housing, the fluid brake rotor acting to pump the fluid when the fluid accumulates in the housing and creating an additional load on the shaft, the resultant load on the shaft being greater than the shear strength of the shaft, whereby the shaft shears when the fluid accumulates in housing to disconnect the generator from the prime mover.

* * * * *